(12) United States Patent
Agarwal et al.

(10) Patent No.: US 8,386,397 B1
(45) Date of Patent: Feb. 26, 2013

(54) SYSTEM AND METHOD FOR CONSTRAINT-BASED REDUCTION OF A SOLUTION SPACE FOR VEHICLE ROUTING

(75) Inventors: Richa Agarwal, Issaquah, WA (US); Lin Wan, Bellevue, WA (US); Jingqiao Zhang, Seattle, WA (US); Pradeep Desai, Bellevue, WA (US); Karthik Balasubramanian, Seattle, WA (US); Michael Mahesh Bhaskaran, Bellevue, WA (US); Girish S. Lakshman, Sammamish, WA (US); Marc A. Onetto, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 12/827,907

(22) Filed: Jun. 30, 2010

Related U.S. Application Data

(60) Provisional application No. 61/288,757, filed on Dec. 21, 2009.

(51) Int. Cl.
*G06Q 30/00* (2012.01)
(52) U.S. Cl. .......... 705/330; 705/338
(58) Field of Classification Search .......... 705/330, 705/338
See application file for complete search history.

(56) References Cited

U.S. PATENT DOCUMENTS

| 6,003,029 | A | 12/1999 | Agrawal |
| 6,023,680 | A | 2/2000 | Wooster |
| 6,418,398 | B1 | 7/2002 | Dueck |
| 6,980,885 | B2 | 12/2005 | Ye |
| 2008/0059056 | A1 | 3/2008 | Chavira |
| 2008/0306795 | A1* | 12/2008 | Ho ................... 705/8 |

OTHER PUBLICATIONS

Desrochers et al., A New Optimization Algorithm for the Vehicle Routing Problem with Time Windows, Operations Research, vol. 40, No. 2, Mar.-Apr. 1992.*

* cited by examiner

*Primary Examiner* — Kevin Flynn
(74) *Attorney, Agent, or Firm* — Robert C. Kowert; Meyertons, Hood, Kivlin, Kowert & Goetzel, P.C.

(57) ABSTRACT

Various embodiments of a system and method for constraint-based reduction of a solution space for vehicle routing are described. Embodiments may include a system configured to identify sets of redundant routes within a solution space. For each given set of redundant routes, the system may utilize one or more constraints associated with conveying shipments on routes of the given set in order to eliminate one or more routes of that set from consideration. For each of multiple routes of the given set that have not been eliminated from consideration, the system may determine a respective cost associated with utilizing that route. The system may also, in response to determining that the cost associated with a particular route that has not been eliminated from consideration is less than the cost associated with other routes that have not been eliminated from consideration, add the particular route to a reduced solution space.

27 Claims, 7 Drawing Sheets

US 8,386,397 B1

SYSTEM AND METHOD FOR CONSTRAINT-BASED REDUCTION OF A SOLUTION SPACE FOR VEHICLE ROUTING

PRIORITY INFORMATION

This application claims benefit of priority to U.S. Provisional Patent Application No. 61/288,757 filed Dec. 21, 2009 titled "System And Method For Constraint-Based Reduction Of A Solution Space For Vehicle Routing" which is hereby incorporated by reference herein in its entirety.

BACKGROUND

Many distribution networks rely on vehicles to transport shipments between participants of the network. For example, trucks may be used to ship products from vendors that supply the products to merchants that sell the products. In distribution networks of substantial size, there may be many vendors that supply products to a merchant. In some cases, such vendors may span a geographically diverse area. For instance, vendor facilities could be located in different cities of varying distances from a merchant's facility. The costs associated with shipping products from different vendors to a merchant may vary depending on the origin and destination of the shipment route. Typically, these costs are paid by vendors, merchants, or some combination thereof. In any case, the shipping expenses associated with shipping products from a vendor to a merchant are often passed to consumers as some component of the final price of a product. Reducing the final price of a product is one way in which merchants gain a competitive advantage over other merchants in the marketplace; reducing the shipping costs associated with acquiring products from vendors is one way in which merchants may reduce the final price of a product.

Figure 1:
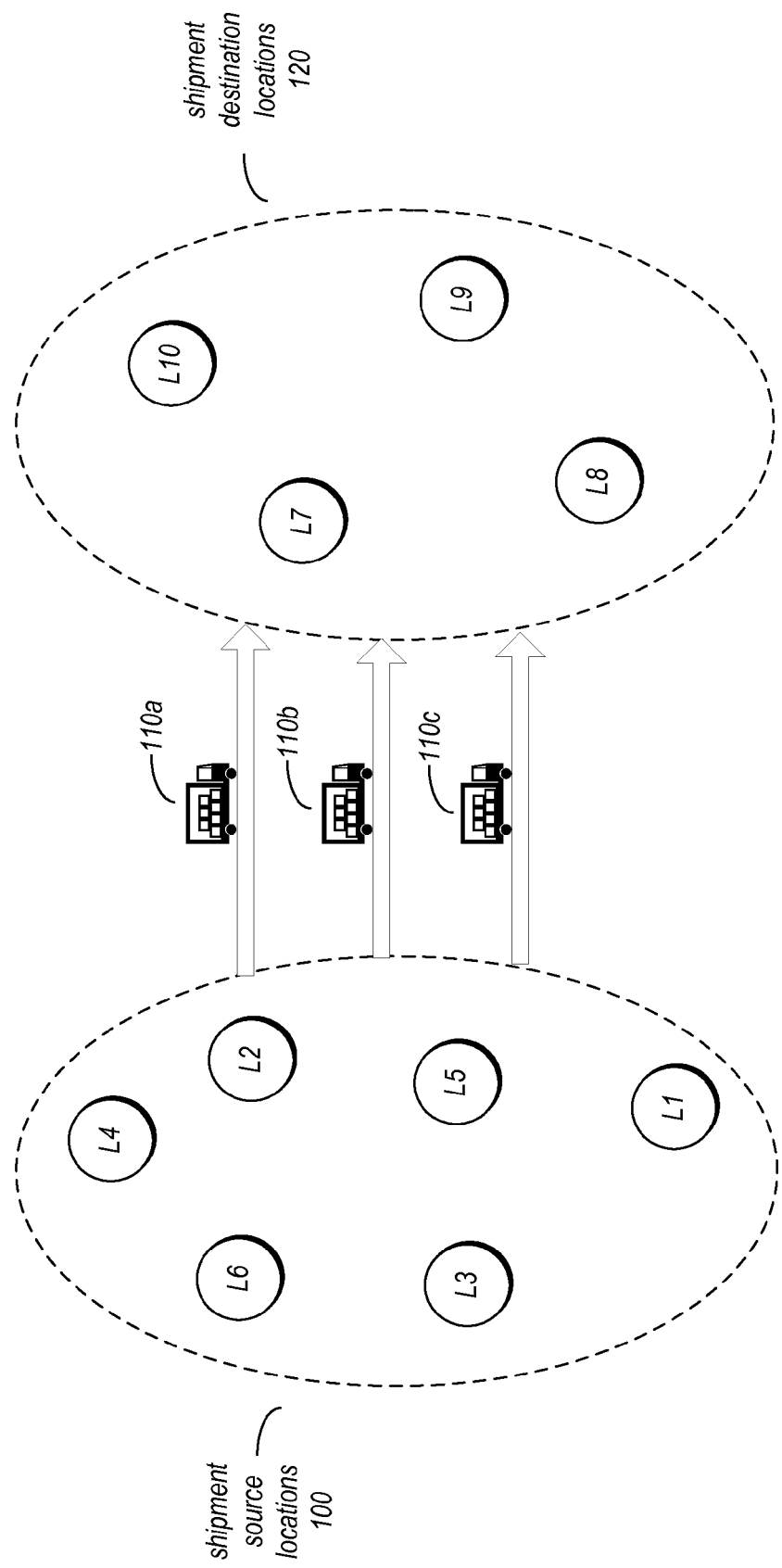
FIG. 1 illustrates a logical representation of a distribution network in which shipments from one or more source locations are provided to one or more destination locations, according to some embodiments.

While the system and method for constraint-based reduction of a solution space for vehicle routing is described herein by way of example for several embodiments and illustrative drawings, those skilled in the art will recognize that the system and method for constraint-based reduction of a solution space for vehicle routing is not limited to the embodiments or drawings described. It should be understood, that the drawings and detailed description thereto are not intended to limit the system and method for constraint-based reduction of a solution space for vehicle routing to the particular form disclosed, but on the contrary, the intention is to cover all modifications, equivalents and alternatives falling within the spirit and scope of the system and method for constraint-based reduction of a solution space for vehicle routing as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for constraint-based reduction of a solution space for vehicle routing are described. Embodiments may include a solution space reduction component configured to evaluate an unreduced solution space to generate a reduced solution space by utilizing a constraint-based approach as described in more detail herein. Note that the phrase unreduced solution space is used solely as convenient nomenclature; in some cases, the unreduced solution space may have been reduced to some extent by some other process or components prior to being evaluated by the solution space reduction component described herein.

In various embodiments, the solution spaces described herein may include feasible routes (e.g., possible or candidate routes) for shipment delivery, each of which may include at least one shipment pickup location and at least one shipment drop off location. In various embodiments, any given feasible route may include the acquisition of shipments from vendors for a merchant. For instance, a merchant may retain the services of a shipment carrier to acquire shipments (e.g., shipments of items to replenish the merchant's inventory) from shipment source locations (e.g., vendor facilities) and delivery them to shipment destination locations (e.g., one or more of the merchant's facilities). In some cases, routes may include multiple shipment pickup locations and/or multiple drop off locations. As described in more detail below, the vehicles that traverse the various routes described herein may have a standard shipping capacity. In various embodiments, the shipments at each shipment source location may be shipments smaller than this standard shipping capacity. In this way, shipments from multiple shipment source locations (e.g., vendor facilities) may in some cases be consolidated onto the same shipment carrier vehicle during a single route. This consolidation may in various embodiments result in more shipments delivered per route, which may result in cost savings for a merchant that retains the services of a shipment carrier. For instance, if a shipment carrier charges the merchant per-route expenses (e.g., mileage, labor, fees, etc.), these expenses can be reduced in the aggregate by utilizing the shipment consolidation techniques described herein. The shipment consolidation techniques described herein may also be considered route consolidation, as an aggregate quantity of shipments may be delivered with fewer overall routes, which may result in a cost savings to a merchant paying for shipping services. In some cases (though not necessarily all cases), a single route that includes shipment acquisitions from multiple different shipment source locations will be less expensive than individual routes that service each of such shipment source locations individually. For instance, this may be the case when shipments are to be acquired from two shipment source locations that are relatively close in distance (e.g., within the same zip code or some other measure of closeness). In other cases, such as when shipment source locations are separated by a relatively large distance, it may not be cost effective to combine shipments from source locations on the same route. In various embodiments, another way in which the overall quantity of routes may be reduced includes dispersing shipments from a shipment source location to multiple shipment destination locations. For example, if a shipment source location includes shipments that are destined for two or more shipment destination locations that are relatively close in distance, it may in some cases cost less to consolidate those shipments onto a single vehicle for delivery relative to the cost of shipping the shipments individually.

In various embodiments, the solution space reduction component described herein may be configured to evaluate an unreduced solution space to generate a reduced solution space such that the reduced solution space includes a smaller quantity of feasible routes than the unreduced solution space. For example, the feasible routes of the reduced solution space may be a particular subset of the feasible routes of the unreduced solution space. For a given group of shipments (e.g., all shipments that are to be acquired in a given day), the unreduced solution space may include each feasible route between a shipment source location and a shipment destination location, including any possible intermediate stops (e.g., other shipment source locations or shipment destination locations). Various embodiments may enforce a constraint on the maximum quantity of intermediate stops on a route. In some cases, this maximum quantity of intermediate stops (and/or the overall quantity of stops in a route) may be specified by a contractual agreement between a merchant and a shipment carrier tasked with acquiring shipments for the merchant. Generally, the unreduced solution space described herein may include all possible combinations and permutations of routes for delivering shipments within the framework of this maximum quantity of intermediate stops (or maximum quantity of overall stops). In some cases the unreduced solution space may deviate from this characterization.

In various embodiments, the solution space reduction component may be configured to create the reduced solution space by identifying sets of redundant routes within the unreduced solution space; for a given set of redundant routes, the solution space reduction component may be configured to select one (or more) routes of the set for inclusion within the reduced solution space while eliminating other routes of that set from consideration. As described in more detail below, different routes within a redundant set may have different characteristics (e.g., cost and/or transit time); in some cases, routes with unfavorable characteristics (e.g., too expensive with respect to cost and/or time) may be eliminated from consideration. In various embodiments, a set of redundant routes may include a set of routes that each include a common combination of locations (e.g., stops, pickup locations, drop off locations, etc.) to be traversed in a different order. Consider a simple example including two locations L1 and L2 that are to be traversed on the way to a destination L7. In this case, the locations L1 and L2 form two redundant routes, which may be denoted as L1-L2-L7 and L2-L1-L7. In this case, locations L1 and L2 might be vendor facilities at which a carrier vehicle may pick up shipments and destination location L7 may be a merchant facility to which the shipments are to be delivered. In various cases, these routes may be referred to as a set of redundant routes because the same shipments may arrive at destination L7 irrespective of which order the locations are traversed. In various embodiments, a set of redundant routes may be routes that include different permutations of the same combination of locations. A combination may be a particular set of locations irrespective of order (e.g., L1-L2 and L2-L1 represent the same combination of locations); a permutation may be an ordered arrangement of elements of a particular set (e.g., L1-L2 and L2-L1 represent different permutations of the same set of locations).

For each distinct set of redundant routes that are identified in the unreduced solution space, the solution space reduction component may be configured to eliminate one or more routes (of the set of redundant routes) from consideration for inclusion within the reduced solution space. In various embodiments, only one route from each set of redundant routes is selected for inclusion within the reduced solution space; the remaining routes of each set may be excluded from the reduced solution space. In other embodiments, more than one route from a given set of redundant routes may be selected for inclusion within the reduced solution space in some implementations. Generally, at least one route of a given set of redundant routes may be excluded from the reduced solution space. In various embodiments, for each set of redundant routes, the solution space reduction component described herein may be configured to eliminate one or more routes of the set from consideration (e.g., consideration for inclusion within the reduced solution space) based on one or more shipping-related constraints (described in more detail below).

In some cases, after the shipping-related constraints have been utilized to eliminate one or more routes of the set of redundant routes, there may remain multiple routes of the set that have not been eliminated (scenarios where one route or less remain are described in more detail below). Of these remaining routes, the solution space reduction component may be configured to determine a cost associated with each route. In various embodiments, the solution space reduction component may be configured to select the lowest cost route and add that route to the reduced solution space. In some embodiments, that route may be the only route of the respective set of redundant routes to be added to the reduced solution space. In various embodiments, the solution space reduction component may be configured to repeat the above-described process for each distinct set of redundant routes. In this way, the solution space reduction component may be configured to create a reduced solution space that includes multiple routes while at the same time includes a smaller quantity of routes than the unreduced solution space.

Various embodiments may also include a route selection component configured to select particular routes from the reduced solution space such that the set of routes selected coincides with all of the shipment locations. In various embodiments, evaluating the reduced solution space may require less computational resources (e.g., processor cycles, memory, processing time, etc.) than evaluating the unreduced solution space. Due to this property, the evaluation of the reduced solution space may require less time than the evaluation of the unreduced solution space (e.g., provided such evaluations are performed on similarly capable computer systems). In one example, the evaluation of the unreduced solution space may require multiple hours whereas evaluation of the reduced solution space may require only minutes or even seconds. In various embodiments, this relative swiftness may enable the reduced solution space to be utilized for real time or near real time planning of vehicle routes, as described in more detail herein.

The route selection component may be configured to utilize a variety of techniques to determine the particular routes that are selected from the reduced solution space. The selected routes may be used for shipment and route planning (described in more detail below). In one example, the route selection component may be configured to initialize and solve a set cover problem, one in which the routes of the reduced solution space are sets of the set cover problem and multiple shipment locations are the elements that are to be covered by the routes in the set cover problem. Other aspects and embodiments are described in more detail below.

Vehicle Routing

FIG. 1 illustrates a model of an example distribution network upon which various embodiments may operate. In the illustrated embodiment, various shipments at shipment source locations 100 (e.g., locations L1-L6) may be scheduled for delivery to various shipment destination locations 110 (e.g., locations L7-L10). Examples of shipment source locations 100 may include vendor or supplier facilities, such as warehouses or nodes in a distribution network or supply chain. Examples of shipment destination locations 120 may include merchant facilities, such as warehouses, materials handling facilities, fulfillment centers, or nodes in a distribution network or supply chain. Note that locations 100 and 110 may generally include any type of location or facility; locations 100 and 110 are not limited to the aforesaid examples. In some cases, any given location may be either a shipment source location or a shipment destination location on a shipment-by-shipment basis. In one example, location L7 may receive shipments from shipment source locations 100 and provide shipments to locations L8-L10. In some cases, shipments among shipment destination locations 120 may be referred to as transshipments. One example of a shipment destination location is a materials handling facility, such as that described below with respect to FIG. 6. In various embodiments, any of locations 100-110 may be identified by address, zip code, some other code or identifier, coordinates, or some combination thereof.

In various embodiments, one or more vehicles 110a-c may be tasked with picking up shipments from one or more shipment source locations and conveying such shipments to one or more shipment destination. In various embodiments, vehicles 110a-c may be operated by one or more shipment carriers contracted by a merchant to deliver shipments form source locations 100 to destination locations 120. In one example, shipment destination locations 120 may be materials handling facilities operated by a merchant that sells items from inventory; one or more vendors may submit shipment pickup requests to the merchant. Such shipments may include items that are utilized to replenish inventory of the materials handling facilities.

In various embodiments, a merchant may instruct a shipment carrier to pickup shipments on a particular route such that shipments from different source locations may be consolidated onto a vehicle for delivery. In some embodiments, each vehicle may be capable of shipping a standard shipping capacity, which may be defined by a weight and/or volumetric capacity. In various portions of this description, each vehicle may be considered to have the same standard shipping capacity; it should be understood that in various embodiments, different vehicles may have different shipment capacities. In various embodiments, the routes that are assigned by the merchant may be determined by a route selection component based on a reduced solution space of routes generated by a solution space reduction component as described in more detail herein.

Example System Configuration

Figure 2:
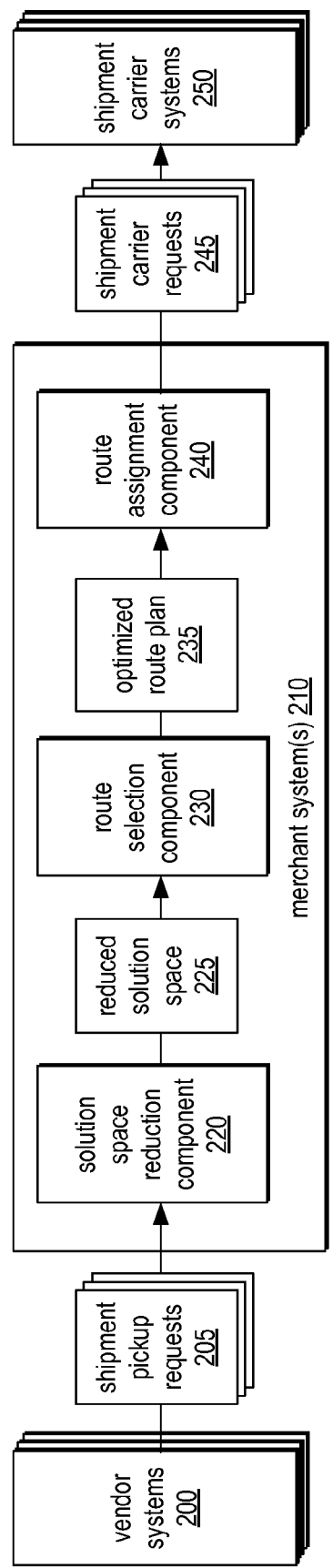
FIG. 2 illustrates a block diagram of the various systems and components that may be configured to implement embodiments of the system and method for constraint-based reduction of a solution space for vehicle routing, according to some embodiments.

FIG. 2 illustrates a block diagram of the systems of various embodiments. In the illustrated embodiment, each of vendor systems 200 may be configured to provide one or more shipment pickup requests 205 to merchant system(s) 210. Each shipment pickup request may specify one or more shipments that are to be picked up, the location of such shipment(s) (e.g., any of L1-L6), and an indication of the quantity of shipments (e.g., a quantity of shipping containers, pallets, shipment weights and/or volume, or some other quantity of measurement). In various embodiments, the shipment request may also specify a range of time during which the shipment will be available for pickup at the respective shipment location (e.g., 2 pm-5 pm or some other range of time). Each shipment request may also specify the shipment destination, such as any of L7-L10.

In various embodiments, merchant systems 210 may be configured with a solution space reduction component 220. The solution space reduction component may be configured to determine an unreduced solution space associated with shipment pickup requests. In various embodiments, this unreduced solution space may be defined by the collective set of shipment locations defined by the shipment pickup requests. In various embodiments, the solution space reduction component may be configured to determine or generate an unreduced solution space as being the set of routes that are possible or feasible between the shipment locations and their destinations. Solution space reduction component 220 may be configured to generate a reduced solution space 225, such as by implementing the methods described below with respect to FIGS. 3 and 5. In various embodiments, this may include identifying different sets of redundant routes in the unreduced solution space and, for each of multiple sets of redundant routes, eliminating at least some routes from the set. This elimination may be based on shipping-related constraints and/or a cost analysis, as described in more detail below. In various embodiments, for each set of redundant routes, one (or more) routes that are not eliminated may be added to a reduced solution space (while excluding eliminated routes from inclusion within the reduced solution space). Generally, the reduced solution space may include a smaller quantity of feasible routes than the corresponding unreduced solution space. In this way, the evaluation of the reduced solution space may require less time than the evaluation of the unreduced solution space, provided such evaluations are performed on similarly capable computer systems.

In various embodiments, the solution space reduction component 220 may be configured to provide the reduced solution space 225 to a route selection component 230. (Note that in some embodiments, route selection component 230 and solution space reduction component 230 may be implemented as an integrated component.) Route selection component 230 may in various embodiments be configured to evaluate the feasible routes of reduced solution space 225 and select a subset (e.g., less than all routes) of those routes. In various embodiments, each feasible route of the reduced solution space 225 may have an associated cost (which may be generated by either or both of solution space reduction component 220 and route selection component 230). For a given route, this cost may include the amount charged by a shipping carrier to traverse such route to perform shipment pickups. Other costs, such as those associated with mileage or vehicle waiting times, may also be taken into consideration. In various embodiments, the route selection component 230 may be configured to select the minimum subset of routes that a) services all shipments (e.g., each shipment location is included within at least one route) and b) does so at the lowest overall cost (based on the individual costs of each route). In various embodiments, such subset of routes may be selected based on one or more specified objectives or performance metrics including but not limited to route cost, route length (e.g., measured according to transit time and/or distance), or some combination thereof.

In one example, route selection component 230 may be configured to initialize and solve a set cover problem, one in which the routes of reduced solution space 225 are sets of the set cover problem and the shipment locations (defined by the shipment pickup requests) are the elements that are to be covered by the routes in the set cover problem. In various embodiments, such a set cover problem may be configured as a minimum set cover problem, which includes overall cost minimization based on the cost of each individual route. In various embodiments, the overall cost minimization may ensure that a shipment is serviced by only one route (e.g., because the servicing of the same shipment location by two routes would be redundant and inefficient from a cost standpoint). In various embodiments, the route selection component 230 may be configured to solve this set cover problem to determine a particular subset of routes from reduced solution space 225; this particular subset may define the routes that are chosen to perform the actual shipment pickups. In some embodiments, instead of initializing and solving the set cover problem described above, the route selection component may be configured to initialize and solve a set partition problem. In various embodiments, the rules used by the route selection component for solving the set partition problem may ensure that each shipment is serviced by one and only one route. In other embodiments, route selection component may be configured to utilize other techniques to select a subset of the feasible routes of reduced solution space 225. In various embodiments, irrespective of the particular techniques utilized, route selection component 230 may be configured to select a subset of routes (e.g., less than all routes) of reduced solution space 225 such that all shipment locations (as defined by the shipment pickup requests) are serviced by that subset of routes. In various embodiments, this subset of routes may be associated with an aggregate cost that is less than the aggregate cost of any other subset that services all of the shipments.

The subset of routes determined by route selection component 230 may be collectively referred to as optimized route plan 235, which specifies the actual routes that are to be utilized by carriers to pick up shipments from shipment source locations and then deliver such shipments to one or more shipment destination locations (e.g., a fulfillment center or materials handling facility). In various embodiments, route selection component 230 may be configured to provide optimized route plan 235 to a route assignment component 240. Route assignment component may be configured to, for each route specified by the optimized route plan, generate a corresponding shipment carrier request 245. Each shipment carrier request may specify one or more shipments that are to be picked up by the carrier on a respective route of the plan, the quantity of such shipment(s) (e.g., quantity of pallets, weight, volumetric characteristics, etc.), the time window during which the shipment is available to be picked up, the shipment location and/or vendor from which the item is to be picked, and any other pertinent information about the shipment or the route. Each shipment carrier request 245 may be provided to respective shipment carrier systems 250.

In various embodiments, any of the communications between components or elements of FIG. 2 may be electronic communications that take place over one or more networks, such as network 985 of FIG. 7 described below. Additionally, each system (e.g., vendor systems 200, merchants systems 210, and shipment carrier systems 250) may be implemented by one or more computer systems, such as the computer system described below with respect to FIG. 7. In various embodiments, any of the data or information illustrated may be stored in a memory, such as memory 920 of FIG. 7.

Example Method(s)

Figure 3:
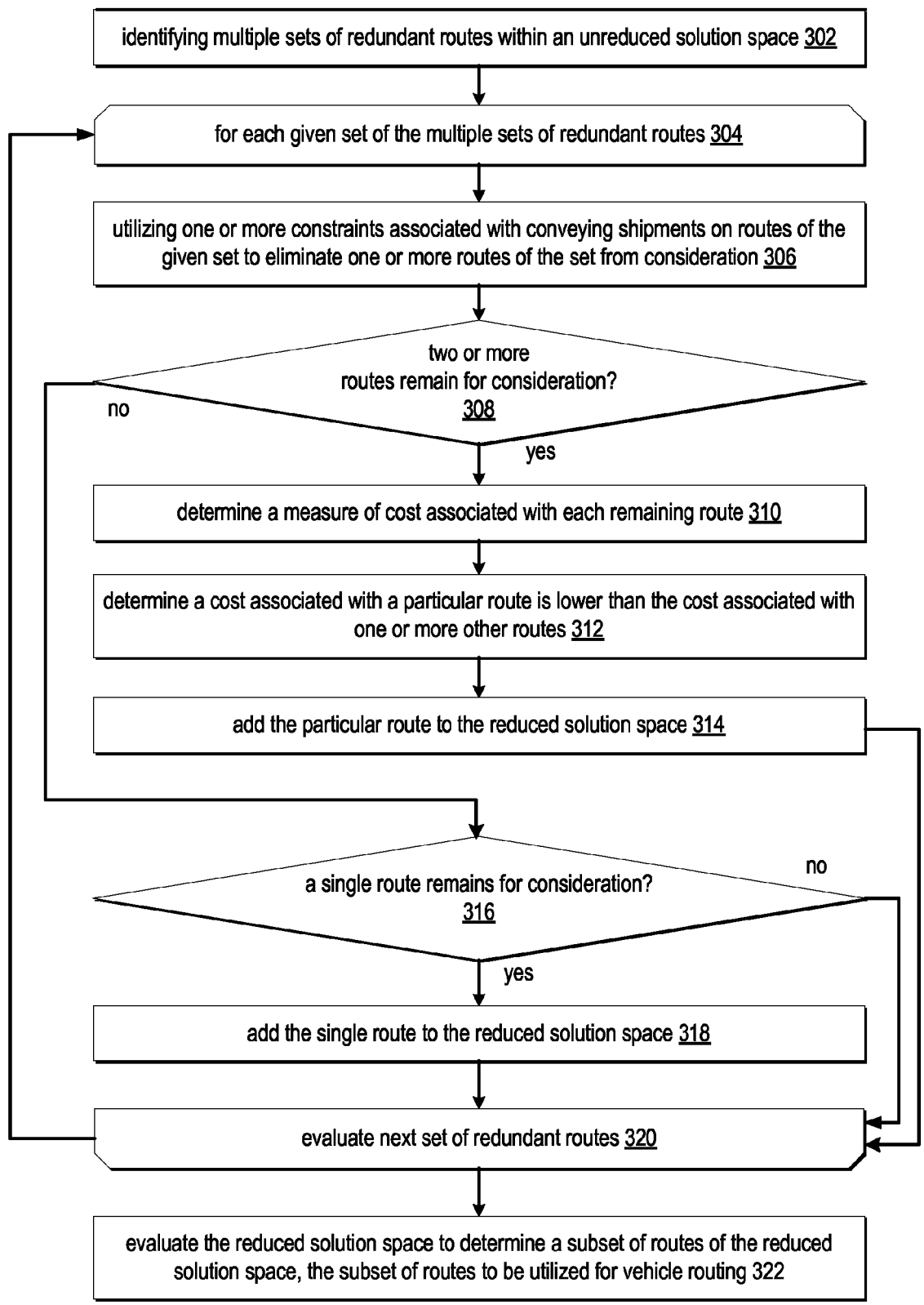
FIG. 3 illustrates a flowchart of an example method for generating a reduced solution space and evaluating such solution space, according to some embodiments.
Figure 5:
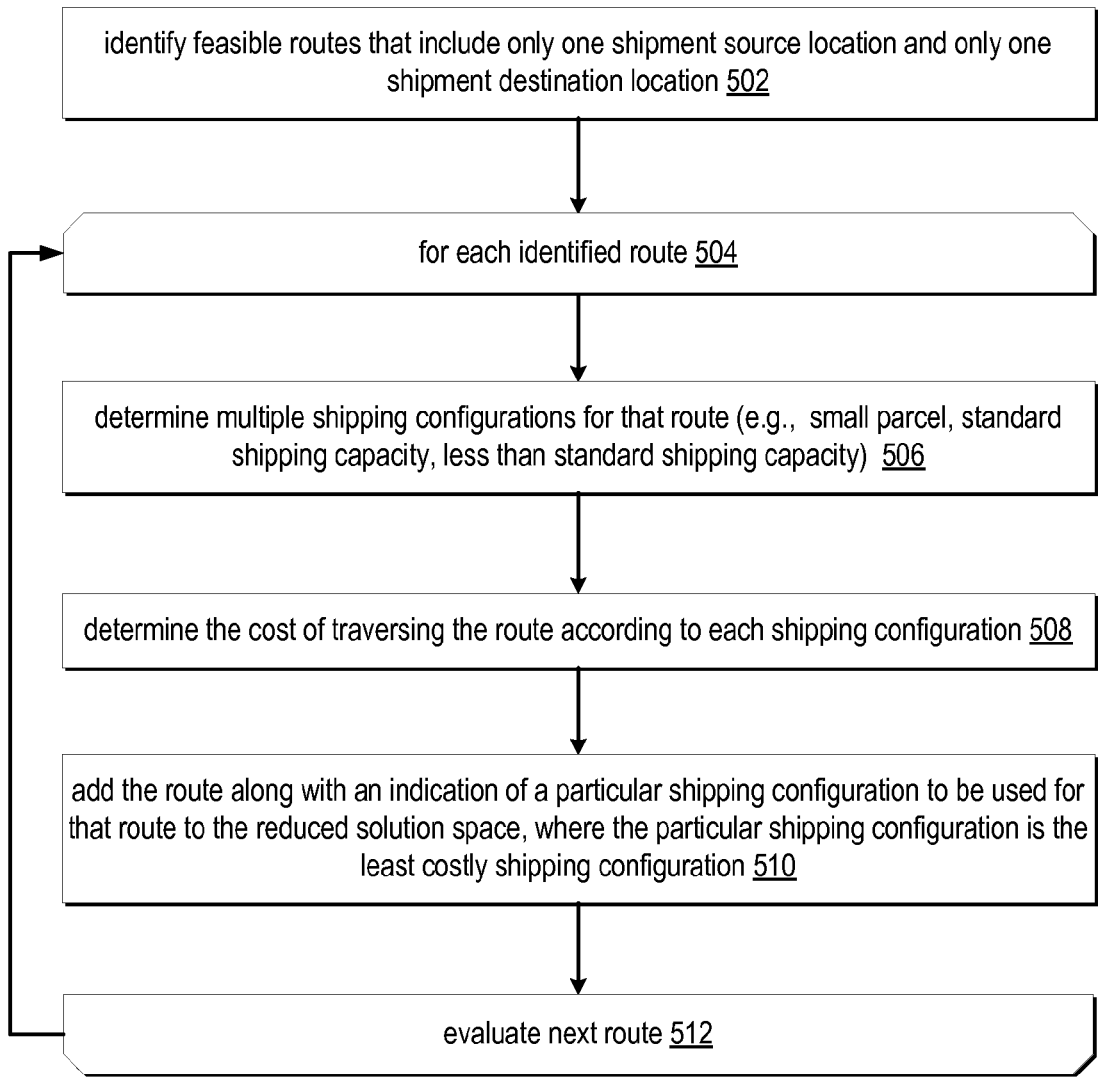
FIG. 5 illustrates a flowchart of an example method for generating a reduced solution space, according to some embodiments.

Various methods may be performed according to the system and method for constraint-based reduction of a solution space for vehicle routing. FIGS. 3 and 5 illustrate flowcharts of examples of such methods. In various embodiments, the methods illustrated by FIGS. 3 and 5 may be implemented by the solution space reduction component and/or route selection component described herein.

FIG. 3 illustrates a method for generating a reduced solution space using shipping-related constraints and/or route costs as well as evaluating such a solution space to determine shipping routes to be used for shipment delivery. As illustrated by block 302, the method may include identifying multiple sets of redundant routes within an unreduced solution space. In various embodiments, the unreduced solution space may be defined by a group of shipment locations of shipments that are to be picked up by one or more shipment carriers. For instance, the method may include evaluating shipment pickup requests 205 (described above) to determine an aggregate listing of all shipment source locations from which shipments are to be acquired and the corresponding shipment destination location. In various embodiments, identifying a given set of redundant routes may include, for each shipment destination and each shipment destined for that shipment destination, determining all possible routes that a carrier vehicle could traverse in order to pickup each shipment and deliver to the designated destination. One example of such a determination is described below with respect to FIGS. 4A-F.

Figure 4A:
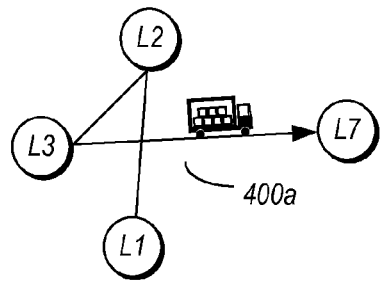
FIGS. 4A-4F illustrate a set of redundant routes, according to some embodiments.
Figure 4B:
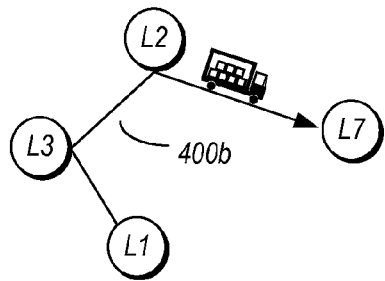
Figure 4C:
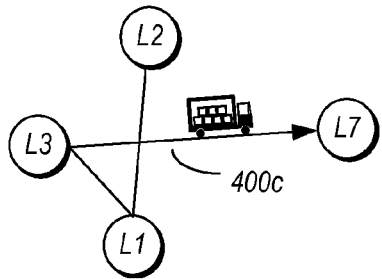
Figure 4D:
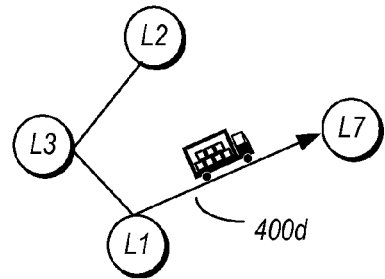
Figure 4E:
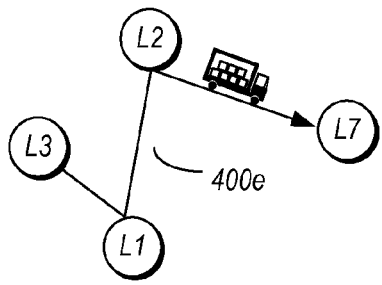
Figure 4F:
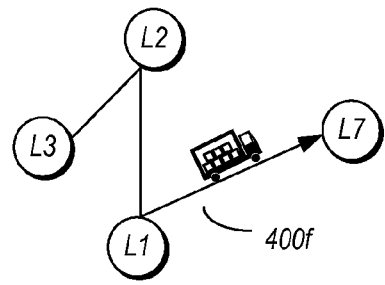
Figure 4G:
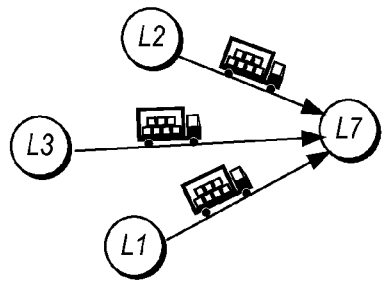
FIG. 4G illustrates individual routes between shipment locations and a common shipment destination, according to some embodiments.

Referring collectively to FIGS. 4A-F and FIG. 3, FIGS. 4A-F illustrate one set of redundant routes that includes six different routes. For instance, consider an example that includes the locations L1, L2 and L3, which are to be traversed on the way to destination location L7. In this case, locations L1, L2 and L3 might be vendor facilities at which a carrier vehicle may pick up shipments and destination location L7 may be a merchant facility to which the shipments are delivered. In this example, there may be six different routes to L7 that each include locations L1, L2 and L3 in some order. In regard to FIGS. 4A-F, these six routes may be denoted as L1-L2-L3-L7, L1-L3-L2-L7, L2-L1-L3-L7, L2-L3-L1-L7, L3-L1-L2-L7 and L3-L2-L1-L7, which are labeled as routes, 400a, 400b, 400c, 400d, 400e, and 400f, respectively. In various cases, these routes may be referred to as a set of redundant routes because the same shipments may arrive at destination L7 irrespective of which order the route locations are traversed. In various embodiments, a set of redundant routes may be routes that include different permutations of the same combination of locations. In various embodiments, a combination may be a set of elements (e.g., L1, L2 and L3) and a permutation of that combination may include that set of elements arranged according to a particular order (e.g., L2-L1-L3). Generally, the quantity of permutations that may be derived from a combination of n elements is n factorial or n!. For example, the combination of elements corresponding to FIGS. 4A-F includes 3 elements, L1, L2 and L3. (Note that destination L7 is not considered here because its order position is not variable.) Accordingly, the quantity of permutations or redundant routes in this set is 3! or 6. In some cases, the set of redundant routes may also include individual routes from each shipment location to the shipment destination. For example, FIG. 4G illustrates three individual routes, which may be denoted as L2-L7, L3-L7 and L1-L7. In some (but not all) cases, it may be less costly to ship items via multiple individual routes (e.g., the routes of FIG. 4G) than it is to ship items via a consolidated route (e.g., routes 400a-400f).

FIG. 4 illustrates a scenario where multiple shipments are picked up at different shipment source locations and delivered to the same shipment destination location. However, in various embodiments, similar techniques may be utilized to determine sets of redundant routes for scenarios where multiple shipments are picked up from a single shipment source location and different ones of those shipments are delivered to different shipment destination locations. One example might include the combination of locations L1 (source), L8 (destination), L9 (destination), and L10 (destination). Generating the set of redundant routes corresponding to that combination of locations may result in routes denoted by L1-L8-L9-L10, L1-L8-L10-L9, L1-L9-L8-L10, L1-L9-L10-L8, L1-L10-L8-L9 and L1-L10-L9-L8. In some embodiments, delivery of shipments to multiple shipment destination locations may be subject to a constraint that requires subsequent shipment destination locations to be separated by no more than a specified maximum distance. In various embodiments, this constraint may be applied in a manner similar to that described with respect to the constraints of block 306.

Returning to FIG. 3, to comprehensively calculate all distinct sets of redundant routes, the method may include determining sets of redundant routes for other n values. For instance, an example combination of two elements (n=2) may include elements L1 and L2. The corresponding sets of redundant routes are L1-L2 and L2-L1. Similar sets may be determined for combination L1 and L3 and combination L2 and L3. In the illustrated embodiments the maximum quantity of locations in a route may be fixed. For instance, in the illustrated embodiments, the maximum quantity of locations in a route is four, although this may be configurable in various embodiments. In some cases, the maximum quantity of locations in a route may be specified by the shipment carrier, such as through a contractual agreement. For instance, carriers may limit the number of stops in a route to curtail per-stop expenses.

In any case, the method may include identifying multiple (in some cases all) distinct sets of redundant routes based on the various shipment source locations and shipment destination locations specified by a group of shipment pickup requests (e.g., shipment pickup requests 205). As illustrated by blocks 304 and 320, the portion of the method corresponding to blocks 306-318 may be performed for a given set of redundant routes (e.g., the set of 6 redundant routes illustrated in FIG. 4) and may be repeated for other each set of redundant routes identified at 302.

As illustrated by block 306, this portion of the method may include utilizing one or more constraints associated with conveying shipments on routes of the given set of redundant routes in order to eliminate one or more routes of the set from consideration (e.g., consideration for inclusion within the reduced set of routes). In various embodiments, each route of the set may be compared to one or more constraints (or requirements) to determine whether the route meets such constraints. In various embodiments, if the route fails to meet any of the constraints, the routes may be eliminated from consideration. Example constraints and techniques for comparing routes to such constraints are described below.

In some embodiments, a constraint may include a maximum quantity of stops permitted within the route. In various embodiments, each shipment location may be considered a stop. In some cases, the origination and/or destination of the carrier vehicle may or may not be considered to be a stop, according to various embodiments. A stop may include a shipment source location, shipment destination location, or some other stop along the route. The method may include determining the total number of stops on the route (e.g., by summing the number of shipment source locations and shipment destination locations in the route). The method may include determining whether the total number of stops in a given route exceeds the quantity specified by the constraint. If the total number of stops in the given route does exceed the constraint, the method may include determining that the route fails to meet the constraint. If the total number of stops in the route does not exceed the constraint, the method may include determining that the given route meets the constraint.

In some embodiments, a constraint may include a maximum distance permitted between any pair of subsequent stops in the route. The method may include determining the distance between each subsequent stop in the route. In some cases the distances may be determined directly (e.g., through calculation); in other cases, the distances may be predetermined and the method may include looking up such distances (e.g., in a data store or database). If the distance between any two subsequent stops in the given route exceeds the maximum distance specified by the constraint, the method may include determining that the route fails to meet the constraint. If the respective distances between each pair of subsequent stops in the given route are each below the maximum distance specified by the constraint, the method may include determining that the route meets the constraint.

In some embodiments, a constraint may include a maximum total distance permitted in the given route. The method may include determining the total distance based on the sum of the distances between each subsequent stop in the route, which may be determined as described above. If the total distance of the given route exceeds the maximum distance specified by the constraint, the method may include determining that the route fails to meet the constraint. If the total distance of the given route is below the maximum distance specified by the constraint, the method may include determining that the route meets the constraint.

In some embodiments, a constraint may include a requirement that the pickup time windows associated with the shipments of the routes are compatible with one another. For instance, as described above, a shipment pickup request may include the location of a shipment as well as a window or range of time during which that shipment is available to be picked up. The method may include determining whether the time windows are compatible with one another by determining whether it is feasible to traverse each stop of the routes in order and during the times specified by the time windows associated with shipments (e.g., based on the travel time and/or distance between stops of the route). If it is not feasible to traverse each stop of the routes in order and during the times specified by the time windows associated with shipments, the method may include determining that the route fails to meet the constraint. If it is feasible to traverse each stop of the routes in order and during the times specified by the time windows associated with shipments, the method may include determining that the route meets the constraint.

In some embodiments, a constraint may include a maximum vehicle load, which may be expressed as a weight, a quantity of cubes, a quantity of pallets, or some other unit. In various embodiments, the method may include determining the total weight of all shipments to be acquired on the given route. In various embodiments, each individual shipment load (specified as a weight, a quantity of cubes, a quantity of pallets, or some other unit) may be specified as part of the shipment pickup requests described above. The method may include summing the individual shipment loads to determine the total load of all shipments on the give route. In various embodiments, if the total load that is determined for all shipments of the given route exceeds that specified by the maximum vehicle load, the method may include determining that the route does not meet the constraint. In various embodiments, if the total load that is determined for all shipments of the given route does not exceed that specified by the maximum vehicle load, the method may include determining that the route meets the constraint.

In various embodiments, a constraint may include a requirement that specifies that the cost of shipping a group of items on the given route be less than the sum of the alternative individual routes for shipping that same group of items. For instance, if the given route includes picking up three shipments each from a different shipment source location (e.g., vendor facility), the cost of that route may be required to be less than the aggregate cost of three routes that obtain each group of shipments individually. For an example route of L1-L2-L3-L7 (where L1, L2, and L3 are shipment source locations and L7 is a shipment destination location), the constraint may require that the cost of route L1-L2-L3-L7 be less than the sum of the costs of the individual routes L1-L7, L2-L7 and L3-L7. In various embodiments, if the cost of the given route is greater than the cost of the sum of the individual routes, the method may include determining that the route does not meet the constraint. In various embodiments, if the cost of the given route is not greater than the cost of the sum of the individual routes, the method may include determining that the route does meet the constraint.

At block 306 of the method, if any route (of the set of redundant routes being evaluated) fails to meet any of the specified constraint(s) (which may include one or more of the above-described constraints), the route may be eliminated from consideration. In various embodiments, this may mean the route will be excluded from the reduced solution space. In various embodiments, if each route (of the set of redundant routes being evaluated) fails to meet one or more constraints, then in At block 308, the method may include determining whether two or more routes (of the set of redundant routes being evaluated) remain for consideration (e.g., have not been eliminated). If it is determined that two or more routes do not remain, the method may proceed to block 316 (as illustrated by the negative output of block 308), which is described further below. If it is determined that two or more routes do remain after the shipping-related constraints are applied at block 306 (as illustrated by the positive output of block 308), the method may include determining a measure of cost associated with each remaining route (block 310). In various embodiments, determining the cost of a given route may include determining the cost of traverse each stop in the route based on mileage costs (or other distance-based costs), hourly costs for vehicle drivers (or other labor costs), costs associated with the quantity of shipments be transported on the route, costs associated with any intermediate stops on the routes, and/or some combination thereof. In various embodiments, the costs may be set by predetermined rules, such as rules established during negotiations between a merchant and one or more vendors.

As illustrated by block 312, the method may include determining that a cost associated with a particular route is lower than the cost associated with one or more other routes. In various embodiments, this may include determining that a particular route has the lowest cost of all routes evaluated at block 310. As illustrated by block 314, the method may include adding that particular route to the reduced solution space. As various portions of the method may be repeated over time (e.g., as denoted by 304 and 320), block 314 may include initializing the reduced solution space if the particular route is the first route to be added to the reduced solution space. For instance, in some embodiments, the reduced solution space may be a data structure stored in memory; initializing the reduced solution space may include creating an initial instance of such data structure.

The method may then proceed to block 320 and the next set of redundant routes may be evaluated at block 304. As described above, if there are not two or more routes that remain at block 308, the method may proceed to block 316. At block 316, the method may include determining whether a single route remains for consideration (e.g., determining whether only one route remains for consideration). If it is determined that a single route does not remain (as illustrated by the negative output of block 316), no route (of the set of redundant routes being evaluated) is added to the reduced solution space. The method may then proceed to block 320 and the next set of redundant routes may be evaluated at block 304. If it is determined that a single route does remain (as illustrated by the positive output of block 316), the method may include adding the single route to the reduced solution space (block 318). The method may then proceed to block 320 and the next set of redundant routes may be evaluated at block 304.

In various embodiments, after all sets of redundant routes have been evaluated, the generation of the reduced solution space may be complete. One example of such a solution space included reduced solution space 225 described above. As described above, the reduced solution space may include a smaller quantity of feasible (e.g., possible or candidate) routes than the corresponding unreduced solution space (because routes may have been eliminated by the application of constraints and/or a cost analysis in accordance with the example method of FIG. 3). In this way, the evaluation of the reduced solution space may require less time than the evaluation of the unreduced solution space, provided such evaluations are performed on similarly capable computer systems. In various embodiments, this relative swiftness may enable the reduced solution space to be utilized for real time or near real time planning of vehicle routes.

As illustrated by block 322, the method may include evaluating the reduced solution space to determine a subset or routes of the reduced solution space; such subset of routes may be the routes that are selected to be utilized for vehicle routing. One example of such routes includes those described above with respect to the optimized route plan.

In various embodiments, the method may include evaluating the feasible routes of the reduced solution space and selecting a subset (e.g., less than all routes) of those routes. In various embodiments, each feasible route of the reduced solution space may have an associated cost; such costs may be generated in a manner similar to the manner described above with respect to block 310). For a given route, this cost may include the amount charged by a shipping carrier to traverse such route to perform shipment pickups. Other costs, such as those associated with mileage or vehicle waiting times, may also be taken into consideration. In various embodiments, the method may include selecting the minimum subset of routes that a) services all shipments (e.g., each shipment location is included within at least one route) and b) does so at the lowest overall cost (e.g., the lowest sum of the individual costs of each route).

In one example, the method may include initializing and solving a set cover problem, one in which the routes of the reduced solution space are sets of the set cover problem and the shipment locations (such as those defined by the shipment pickup requests) are the elements that are to be covered by the routes in the set cover problem. In various embodiments, such a set cover problem may be configured as a minimum set cover problem, which includes overall cost minimization based on the cost of each individual route. In various embodiments of the method, enforcing overall cost minimization may ensure that a shipment is serviced by only one route (e.g., because the servicing of the same shipment location by two routes would be redundant and inefficient from a cost standpoint). In various embodiments, the method may include solving this set cover problem to determine a particular subset of routes from the reduced solution space; this particular subset may define the routes that are chosen to perform the actual shipment pickups. In some embodiments, instead of initializing and solving the set cover problem described above, the method may include initializing and solving a set partition problem (or set partitioning problem). In various embodiments, the method may include utilizing rules to ensure that each shipment is serviced by one and only one route. In other embodiments, the method may include utilize other techniques to select a subset of the feasible routes of the reduced solution space. In various embodiments, irrespective of the particular techniques utilized, the method may include selecting a subset of routes (e.g., less than all routes) of the reduced solution space such that all shipment locations (e.g., as defined by the shipment pickup requests) are serviced by that subset of routes. In various embodiments, this subset of routes may be associated with an aggregate cost that is less than the aggregate cost of any other subset that services all of the shipments. In various embodiments, the method may also include generating an optimized route plan that includes the determined subset of routes described above. In various embodiments, the method may include generating one or more shipment carrier requests based on such a route plan, such as described above with respect to shipment carrier requests 245.

In FIG. 3, the techniques for adding candidate routes to the reduced solution space largely pertain to routes that include multiple shipment source locations and/or multiple shipment destination locations. In various embodiments, other types of routes may be added to the reduced solution space prior to the evaluation of the reduced solution space, such as the evaluation performed at block 322. FIG. 5 illustrates an example method for adding routes that include only one shipment source location (e.g., a vendor facility) and only one shipment destination location (e.g., merchant facility). In various embodiments the illustrated method may be performed before, after, or concurrently with the method illustrated in FIG. 3.

As illustrated by block 502 of FIG. 5, the method may include identifying feasible routes that include only one shipment source location and only one shipment destination location. Example of such a route might include L1-L7 or L2-L10, in terms of the Figures described above. As illustrated by block 504 and block 512, the portions of the method corresponding to blocks 506-510 may be repeated for each feasible route. As illustrated by block 506, the method may include, for the route under evaluation, determining multiple shipping configurations. One example of a shipping configuration may include the type of carrier to convey the shipments of that route. For instance, a small parcel carrier might specialize in shipments below a certain weight or size threshold. In some cases, shipment with such carriers may be more expensive than carriers that handle larger shipments (e.g., due to economies of scale). Another type of carrier may include a carrier that handles standard shipping capacities. For instance, one truckload (TL) of shipments may be considered to be a standard shipping capacity. Another type of carrier may include a carrier that handles less than standard shipping capacities. For example, some quantity of shipments that is less than a truckload (e.g., less-than-truckload or "LTL") may be considered to be a less than standard shipping capacity. As illustrated by block 508, the method may include determining the cost associated with traversing the route according to each shipping option, which may be performed in a manner similar to that of block 310 of FIG. 3. For example, each shipping configuration may have a different cost based on mileage costs (or other distance-based costs), hourly costs for vehicle drivers (or other labor costs), costs associated with the quantity of shipments be transported on the route, costs associated with any stops on the routes, and/or some combination thereof. In various embodiments, determining the cost of traversing a given route may be determined based on any of a variety of objectives or performance metrics, which may include but are not limited to route cost (e.g., the costs described above), route transit time (e.g., a quantity of time to traverse a route with a vehicle), route length (e.g., a distance), some other performance metric, or some combination thereof. In various embodiments, specific routes may be selected to optimize such objectives (e.g., to minimize route cost, route length and/or transit time). As illustrated by block 510, the method may also include adding the route along with a particular shipping configuration to be used for that route to the reduced solution space; the particular shipping configuration may be the shipping configuration that is determined to be the lease costly out of the multiple shipping configurations. In various embodiments, adding the route (and corresponding shipping configuration) to the reduced solution space may include adding such items to the same reduced solution space described above with respect to blocks 314 and 318. If any routes remain unevaluated, the method may include evaluating those routes, as illustrated by block 512 and block 504.

Additional Embodiments

Various descriptions above largely refer to "inbound" shipments, or shipments that are picked up from vendors and provided to a merchant. Note that the techniques described herein may also be applied to "outbound" shipments, or shipments that are shipped from a vendor (e.g., the transshipments described above). In various embodiments, shipment source locations need not be limited to vendor or supplier facilities. In some cases, a shipment source location may be a merchant's facility. Likewise, shipment destination locations need not be limited to merchant facilities. For instance, any shipment destination location could be facilities operated by a variety of supply chain or distribution network participants (e.g., vendors, manufacturers, resellers, etc.).

Various descriptions above also largely refer to vehicles as being trucks and routes as being land-based. Neither of such characteristics is intended to be interpreted in a limiting manner. In general, the techniques described herein may be applied to any type of vehicle configured to carry, pull, or otherwise convey shipments. Examples of such vehicles might include watercraft (e.g., boat or ship), aircraft (e.g., a cargo or passenger plane), and land-based vehicles other than trucks. Likewise, route may include routes by land, sea, air or some combination thereof. Additionally, route "stops" may be tailored to the particular type of route traversed. For instance, a sea port and airport may be examples of stops for a sea route and air route, respectively.

In various embodiments, the solution space reduction component may be configured to perform one or more pre-processing functions before generating a reduced solution space. In various embodiments, the solution space reduction component may be configured to consolidate all shipments at a given shipment source location into a single shipment. If that shipment exceeds the standard shipping capacity (described above), a quantity of shipments equal to the standard shipping capacity may be removed from the consolidated shipment and marked for pickup as a direct route (e.g., a route with no intermediate stops associated with shipment consolidation) from the respective shipment source location to a shipment destination location (e.g., merchant facility). In various embodiments, any shipments leftover may be considered for pickup according to the techniques described herein.

Various embodiments of the system and method for constraint-based reduction of a solution space for vehicle routing may facilitate "green initiatives" through a variety of techniques including but not limited to reducing aggregate vehicle emissions and reducing fuel consumption in a distribution network. In one example, embodiments may reduce the quantity of vehicle routes (and associated vehicle emissions and/or fuel consumption) by consolidating routes for inventory acquisition according to the various techniques described herein.

Materials Handling Facility

Figure 6:
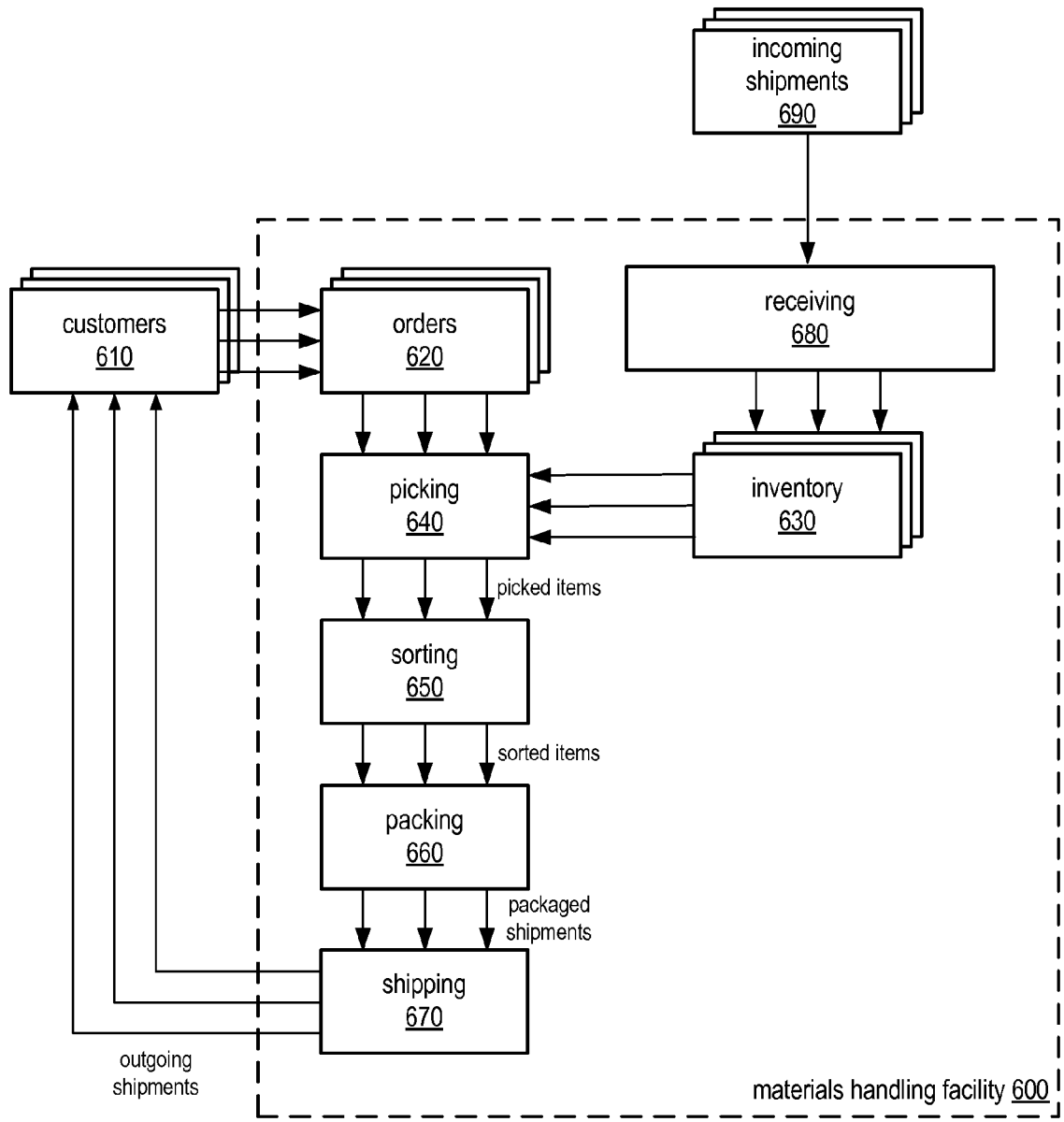
FIG. 6 illustrates a logical representation of the operations of an example materials handling facility, according to some embodiments.

Various descriptions presented above may refer to various facilities and warehouses, any of which may be a materials handling facility. One example of a facility includes the materials handling facility of FIG. 6. FIG. 6 illustrates a logical representation or view of the operation of a materials handling facility 600 in which embodiments of the system and method for constraint-based reduction of a solution space for vehicle routing may be implemented. In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 610 may submit orders 620 to the product distributor, where each order 620 specifies one or more items from inventory 630 to be shipped to the customer that submitted the order. To fulfill the customer orders 620, the one or more items specified in each order may be retrieved, or picked, from inventory 630 (which may also be referred to as stock storage) in the materials handling facility, as indicated at 640. Picked items may be delivered or conveyed, if necessary, to one or more stations in the materials handling facility for sorting 650 into their respective orders, packing 660, and finally shipping 670 to the customers 610. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system. A picked, packed and shipped order does not necessarily include all of the items ordered by the customer; an outgoing shipment to a customer may include only a subset of the ordered items available to ship at one time from an inventory storage location.

A materials handling facility may also include a receiving 680 operation for receiving shipments of stock (e.g., units of inventory items) from one or more sources (e.g., vendors) and for moving or "stowing" the received stock into stock storage (e.g., inventory 630). The receiving 680 operation may also receive and process returned purchased or rented items or orders from customers. At least some of these items are typically returned to inventory 630. The various operations of a materials handling facility may be located in one building or facility, or alternatively may be spread or subdivided across two or more buildings or facilities. In various instances, it should be understood that references to elements, units, items, processes (or anything else) as being located within materials handling facility 600 may easily be extended to encompass elements, units, items, processes (or anything else) proximate to but not physically located within materials handling facility. For example, various elements, units, items, or processes (or anything else) may be implemented outside of the materials handling facility, according to some embodiments.

Example Computer System

Various embodiments of a system and method for constraint-based reduction of a solution space for vehicle routing, as described herein, may be executed on one or more computer systems, which may interact with various other devices. Note that any component, action, or functionality described above with respect to FIGS. 1-6 may be implemented via one or more computer systems configured as computer system 900 of FIG. 7, according to various embodiments. For instance, in various embodiments, computer system 900 may implement a vendor system, merchant system or shipment carrier system. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing solution space reduction component (SSRC) 220, route selection component (RSC) 230 and route assignment component (RAC) 240 (configured as described above) are shown stored within system memory 920 as program instructions 922 that may be executed by processor 910-n. Data 932 of memory 920 may also include reduced solution space 225 and optimized route plan 235, configured as described above. Additionally, data 932 of memory 920 may store any of the data structures described above, in some embodiments. In various embodiments, program instructions and/or data may be received, sent or stored upon different types of computer-accessible media or on similar media separate from system memory 920 or computer system 900. While computer system 900 is illustrated as implementing a merchant system (e.g., merchant system 210), a similarly equipped computer system may be utilized to implement vendor system(s) 200 or shipment carrier system(s) 250.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data or information to be exchanged between computer system 900 and other devices (e.g., vendor systems 200 and/or shipment carrier systems 250, configured as described above) attached to a network 985 or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
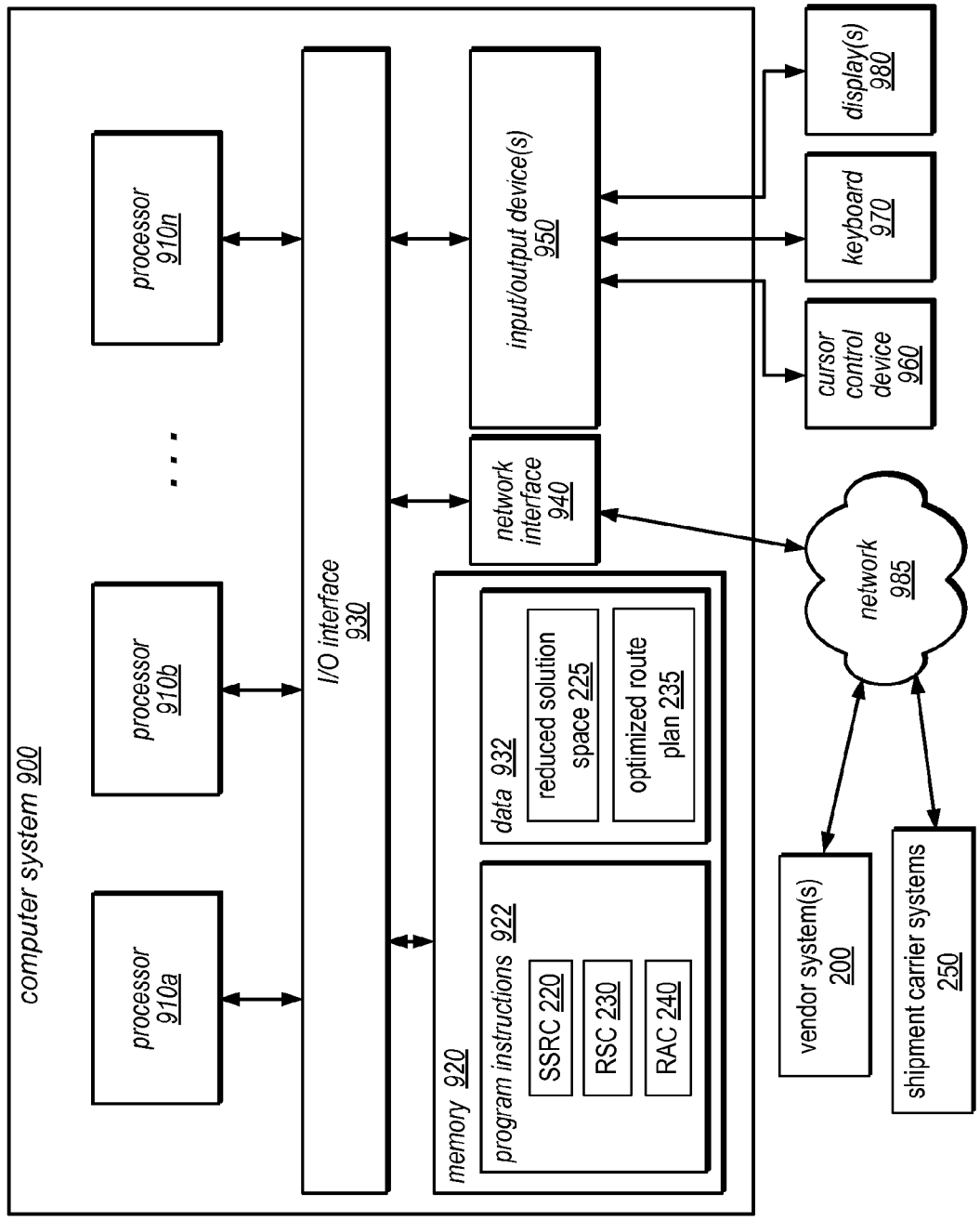
FIG. 7 illustrates one example of a computer system suitable for implementing various elements of the system and method for constraint-based reduction of a solution space for vehicle routing, according to some embodiments.

As shown in FIG. 7, memory 920 may include program instructions 922 configured to implement any element or action described above, such as the functionality of solution space reduction component 220, route selection component 230 and route assignment component 240. In one embodiment, the program instructions may implement the methods described above, such as the method illustrated by FIGS. 3 and 5. In other embodiments, different elements and data may be included. Note that data 932 may include any data described above with respect to FIGS. 1-6, including reduced solution space 225 and optimized route plan 235.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally, a computer-accessible medium may include a computer-accessible storage medium or computer-accessible memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method for generating a reduced solution space based on a given solution space that includes routes for conveying a collection of shipments, wherein the method comprises:
performing, by one or more computing devices:
identifying multiple sets of redundant routes within the given solution space, wherein each route of a given set of redundant routes includes a different permutation of a common set of locations, wherein each permutation indicates a different order in which a particular combination of locations are to be traversed by a vehicle for conveying shipments;
for each given set of at least some of the multiple sets of redundant routes:
utilizing one or more constraints associated with conveying shipments on routes of the given set to eliminate one or more routes of the given set from consideration;
for each of multiple routes of the given set that have not been eliminated from consideration, determining a respective cost associated with utilizing the route; and
in response to determining that the cost associated with a particular route of the given set that has not been eliminated from consideration is less than the cost associated with each of one or more other routes of the given set that have not been eliminated from consideration, adding the particular route of the given set to the reduced solution space without adding the other routes of the given set to the reduced solution space;
analyzing the reduced solution space to select a particular subset of one or more routes for conveying the collection of shipments, wherein the reduced solution space comprises a plurality of routes from the given solution space including one route from each given set of the at least some of the multiple sets of redundant routes.

2. The method of claim 1, wherein the particular subset of routes includes all locations at which shipments of the collection of shipments are located.

3. The method of claim 2, wherein said analyzing the reduced solution space to select a particular subset comprises solving a set cover problem, wherein routes of the reduced solution space are sets of the set cover problem and locations of shipments are the elements to be covered in the set cover problem.

4. The method of claim 2, wherein said analyzing the reduced solution space to select a particular subset comprises:
identifying multiple subsets of routes from the reduced solution space, wherein each subset of routes includes all locations at which shipments of the collection of shipments are located; and
selecting said particular subset from the multiple subsets in response to determining that the particular subset meets one or more specified objectives.

5. The method of claim 4, wherein said one or more specified objectives include an objective associated with at least one of: route cost, route length, or route travel time.

6. The method of claim 2, wherein the method comprises, for one or more routes of the particular subset of routes, generating one or more respective shipment carrier requests, wherein each shipment carrier request specifies that a respective shipment carrier is requested to pickup one or more shipments along a respective route.

7. The method of claim 1, wherein said one or more constraints comprise one or more of:
a constraint that specifies a maximum quantity of stops permitted on a route;
a constraint that specifies a maximum distance permitted between subsequent stops in a route;
a constraint that specifies a maximum total distance permitted in a route;
a constraint that specifies pickup windows for locations of a route must be compatible based on one or more of: the travel time between each location and the distance between each location;
a constraint that specifies shipments consolidated on the route are not to exceed a maximum vehicle load; or
a constraint that specifies a cost associated with conveying multiple groups of shipments together on the same route be less than the sum of costs associated with conveying each group of shipments separately on individual routes.

8. The method of claim 7, wherein one or more of said constraints are specified by a contractual agreement between a vendor and a merchant.

9. The method of claim 1, wherein the method comprises identifying a route that includes only one shipment source location and one shipment destination location and adding that route to the reduced solution space.

10. A system for generating a reduced solution space based on a given solution space that includes routes for conveying a collection of shipments, the system comprising:
a memory; and
one or more processors coupled to the memory, wherein the memory comprises program instructions executable by the one or more processors to:
identify multiple sets of redundant routes within the given solution space, wherein each route of a given set of redundant routes includes a different permutation of a common set of locations, wherein each permutation indicates a different order in which a particular combination of locations are to be traversed by a vehicle for conveying shipments;
for each given set of at least some of the multiple sets of redundant routes:
utilize one or more constraints associated with conveying shipments on routes of the given set to eliminate one or more routes of the given set from consideration;
for each of multiple routes of the given set that have not been eliminated from consideration, determine a respective cost associated with utilizing the route; and
in response to determining that the cost associated with a particular route of the given set from the given set that has not been eliminated from consideration is less than the cost associated with each of one or more other routes of the given set that have not been eliminated from consideration, add the particular route of the given set to the reduced solution space without adding the other routes of the given set to the reduced solution space;

analyze the reduced solution space to select a particular subset of one or more routes for conveying the collection of shipments, wherein the reduced solution space comprises a plurality of routes from the given solution space including one route from each given set of the at least some of the multiple sets of redundant routes.

11. The system of claim 10, wherein the particular subset of routes includes all locations at which shipments of the collection of shipments are located.

12. The system of claim 11, wherein to analyze the reduced solution space to select a particular subset the program instructions are configured to solve a set cover problem, wherein routes of the reduced solution space are sets of the set cover problem and locations of shipments are the elements to be covered in the set cover problem.

13. The system of claim 11, wherein to analyze the reduced solution space to select a particular subset the program instructions are configured to:
identify multiple subsets of routes from the reduced solution space, wherein each subset of routes includes all locations at which shipments of the collection of shipments are located; and
select said particular subset from the multiple subsets in response to determining that the particular subset meets one or more specified objectives.

14. The system of claim 13, wherein said one or more specified objectives include an objective associated with at least one of: route cost, route length, or route travel time.

15. The system of claim 11, wherein the program instructions are configured to, for one or more routes of the particular subset of routes, generate one or more respective shipment carrier requests, wherein each shipment carrier request specifies that a respective shipment carrier is requested to pickup one or more shipments along a respective route.

16. The system of claim 10, wherein said one or more constraints comprise one or more of:
a constraint that specifies a maximum quantity of stops permitted on a route;
a constraint that specifies a maximum distance permitted between subsequent stops in a route;
a constraint that specifies a maximum total distance permitted in a route;
a constraint that specifies pickup windows for locations of a route must be compatible based on one or more of: the travel time between each location and the distance between each location;
a constraint that specifies shipments consolidated on the route are not to exceed a maximum vehicle load; or
a constraint that specifies a cost associated with conveying multiple groups of shipments together on the same route be less than the sum of costs associated with conveying each group of shipments separately on individual routes.

17. The system of claim 16, wherein one or more of said constraints are specified by a contractual agreement between a vendor and a merchant.

18. The system of claim 10, wherein the program instructions are configured to identify a route that includes only one shipment source location and one shipment destination location and add that route to the reduced solution space.

19. A non-transitory computer-readable storage medium for generating a reduced solution space based on a given solution space that includes routes for conveying a collection of shipments, the medium storing program instructions computer-executable on a computer system to:
identify multiple sets of redundant routes within the given solution space, wherein each route of a given set of redundant routes includes a different permutation of a common set of locations, wherein each permutation indicates a different order in which a particular combination of locations are to be traversed by a vehicle for conveying shipments;
for each given set of at least some of the multiple sets of redundant routes:
utilize one or more constraints associated with conveying shipments on routes of the given set to eliminate one or more routes of the given set from consideration;
for each of multiple routes of the given set that have not been eliminated from consideration, determine a respective cost associated with utilizing the route; and
in response to determining that the cost associated with a particular route of the given set that has not been eliminated from consideration is less than the cost associated with each of one or more other routes of the given set that have not been eliminated from consideration, add the particular route of the given set to the reduced solution space without adding the other routes of the given set to the reduced solution space;
analyze the reduced solution space to select a particular subset of one or more routes for conveying the collection of shipments, wherein the reduced solution space comprises a plurality of routes from the given solution space including one route from each given set of the at least some of the multiple sets of redundant routes.

20. The computer-readable storage medium of claim 19, wherein the reduced solution space such that the particular subset of routes includes all locations at which shipments of the collection of shipments are located.

21. The computer-readable storage medium of claim 20, wherein to analyze the reduced solution space to select a particular subset the program instructions are configured to solve a set cover problem, wherein routes of the reduced solution space are sets of the set cover problem and locations of shipments are the elements to be covered in the set cover problem.

22. The computer-readable storage medium of claim 20, wherein to analyze the reduced solution space to select a particular subset the program instructions are configured to:
identify multiple subsets of routes from the reduced solution space, wherein each subset of routes includes all locations at which shipments of the collection of shipments are located; and
select said particular subset from the multiple subsets in response to determining that the particular subset meets one or more specified objectives.

23. The computer-readable storage medium of claim 22, wherein said one or more specified objectives include an objective associated with at least one of: route cost, route length, or route travel time.

24. The computer-readable storage medium of claim 20, wherein the program instructions are configured to, for one or more routes of the particular subset of routes, generate one or more respective shipment carrier requests, wherein each shipment carrier request specifies that a respective shipment carrier is requested to pickup one or more shipments along a respective route.

25. The computer-readable storage medium of claim 19, wherein said one or more constraints comprise one or more of:
- a constraint that specifies a maximum quantity of stops permitted on a route;
- a constraint that specifies a maximum distance permitted between subsequent stops in a route;
- a constraint that specifies a maximum total distance permitted in a route;
- a constraint that specifies pickup windows for locations of a route must be compatible based on one or more of: the travel time between each location and the distance between each location;
- a constraint that specifies shipments consolidated on the route are not to exceed a maximum vehicle load; or
- a constraint that specifies a cost associated with conveying multiple groups of shipments together on the same route be less than the sum of costs associated with conveying each group of shipments separately on individual routes.

26. The computer-readable storage medium of claim 25, wherein one or more of said constraints are specified by a contractual agreement between a vendor and a merchant.

27. The computer-readable storage medium of claim 19, wherein the program instructions are configured to identify a route that includes only one shipment source location and one shipment destination location and add that route to the reduced solution space.

* * * * *